US007089005B2

(12) United States Patent
Reddy

(10) Patent No.: US 7,089,005 B2
(45) Date of Patent: Aug. 8, 2006

(54) HANDOVER BETWEEN A CELLULAR SYSTEM AND A WIRELESS LOCAL AREA NETWORK

(75) Inventor: Gautam G. Reddy, King of Prussia, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 75 days.

(21) Appl. No.: 10/626,940

(22) Filed: Jul. 25, 2003

(65) Prior Publication Data

US 2004/0023669 A1 Feb. 5, 2004

Related U.S. Application Data

(60) Provisional application No. 60/399,814, filed on Jul. 31, 2002.

(51) Int. Cl.
*H04Q 7/20* (2006.01)
(52) U.S. Cl. ............... 455/436; 455/440; 455/443; 455/452.2; 370/328
(58) Field of Classification Search ............ 455/422.1, 455/426.2, 432.1, 436, 440, 442, 444, 456.1, 455/456.3; 370/331, 436, 338; 709/227
See application file for complete search history.

(56) References Cited

U.S. PATENT DOCUMENTS

| 5,826,188 | A * | 10/1998 | Tayloe et al. ............... 455/436 |
| 5,918,176 | A | 6/1999 | Arrington, Jr. et al. |
| 6,243,581 | B1 * | 6/2001 | Jawanda ................... 455/432.2 |
| 6,400,946 | B1 * | 6/2002 | Vazvan et al. ............ 455/432.1 |
| 6,549,768 | B1 * | 4/2003 | Fraccaroli ................ 455/456.3 |
| 6,625,135 | B1 * | 9/2003 | Johnson et al. ............. 370/332 |
| 2002/0061766 | A1 | 5/2002 | Sato et al. |
| 2002/0147008 | A1 * | 10/2002 | Kallio ........................ 455/437 |
| 2002/0184418 | A1 * | 12/2002 | Blight ........................ 710/100 |
| 2003/0095522 | A1 * | 5/2003 | Korus et al. ................ 370/338 |
| 2003/0118015 | A1 * | 6/2003 | Gunnarsson et al. ........ 370/389 |
| 2003/0156566 | A1 | 8/2003 | Griswold et al. |
| 2003/0202497 | A1 | 10/2003 | Csapo |
| 2004/0008645 | A1 * | 1/2004 | Janevski et al. ............ 370/331 |
| 2004/0063426 | A1 * | 4/2004 | Hunkeler ................. 455/426.1 |
| 2004/0105434 | A1 * | 6/2004 | Baw .......................... 370/355 |
| 2004/0203732 | A1 * | 10/2004 | Brusilovsky et al. .... 455/552.1 |
| 2004/0203792 | A1 * | 10/2004 | Shaheen et al. ............ 455/444 |
| 2004/0203863 | A1 * | 10/2004 | Huomo ..................... 455/456.1 |
| 2004/0203873 | A1 * | 10/2004 | Gray ........................ 455/456.1 |
| 2005/0048977 | A1 * | 3/2005 | Dorenbosch et al. ....... 455/441 |
| 2005/0094593 | A1 * | 5/2005 | Buckley ..................... 370/328 |
| 2005/0239443 | A1 * | 10/2005 | Watanabe et al. ......... 455/414.1 |

FOREIGN PATENT DOCUMENTS

CN 1156528 A 8/1997
CN 1156528 A 8/1997

(Continued)

*Primary Examiner*—Joseph Feild
*Assistant Examiner*—Kamran Afshar
(74) *Attorney, Agent, or Firm*—Volpe & Koenig, P.C.

(57) ABSTRACT

A system facilitates handover of a wireless transmit and receive unit (WTRU) between a cellular network and a wireless local area network (WLAN). The WLAN communicates with a cellular network. A location of the WTRU is determined. The coverage areas of the WLAN and cellular network are determined. The WTRU is informed of the existence of the WLAN when the WTRU approaches the coverage area of the WLAN. The WTRU is handed over from the cellular network to the WLAN when the WTRU is in the coverage area of the WLAN and vice versa.

30 Claims, 2 Drawing Sheets

FOREIGN PATENT DOCUMENTS

| | | |
|---|---|---|
| CN | 1304619 A | 7/2001 |
| CN | 1304619 A | 7/2001 |
| CN | 1356006 A | 6/2002 |
| CN | 1356006 A | 6/2002 |
| EP | 1049281 A1 | 11/2000 |
| EP | 1049281 A1 | 11/2000 |
| EP | 1083765 A2 | 3/2001 |
| WO | 95/34149 | 12/1995 |
| WO | 9534149 | 12/1995 |
| WO | 99/52307 | 10/1999 |
| WO | 9952307 | 10/1999 |
| WO | 00/62572 | 10/2000 |
| WO | 0062572 | 10/2000 |
| WO | 02/39775 A1 | 5/2002 |
| WO | 0239775 A1 | 5/2002 |

* cited by examiner

HANDOVER BETWEEN A CELLULAR SYSTEM AND A WIRELESS LOCAL AREA NETWORK

CROSS REFERENCE TO RELATED APPLICATION(S)

This application claims priority from U.S. Provisional Application No. 60/399,814, filed Jul. 31, 2002, which is incorporated by reference as if fully set forth.

FIELD OF INVENTION

This invention relates to wireless digital communications. More particularly, the invention relates to the interaction and handoff of wireless communications between a cellular network and a localized wireless network with user equipment whose geolocation can be determined.

BACKGROUND

Mobile wireless communication has progressed from closed platforms in primarily voice-based cellular phones to becoming embedded in a variety of open platforms which support data and voice, such as smartphones, notebook computers and personal digital assistants (PDAs). Different types of wireless services include WLAN and cellular networks. When a user desires to switch between different services in an unfamiliar geographical area, the available services are difficult to determine. Often, a user must contact the wireless service provider to determine which services are available in particular geographical areas. If the user travels in many different geographic areas, the burden of trying to determine which services are available in which geographic areas becomes too great.

Accordingly, there exists a need for a user to more easily determine the existence of services in a particular geographic area.

SUMMARY

A system facilitates handover of a wireless transmit and receive unit (WTRU) between a cellular network and a wireless local area network (WLAN). The WLAN communicates with a cellular network. A location of the WTRU is determined. The coverage area of the WLAN is determined. The WTRU is informed of the existence of the WLAN when the WTRU approaches the coverage area of the WLAN. The WTRU is handed over from the cellular network to the WLAN when the WTRU is in the coverage area of the WLAN and vice-versa.

BRIEF DESCRIPTION OF THE DRAWING(S)

DETAILED DESCRIPTION OF THE PREFERRED EMBODIMENT(S)

Figure 1:
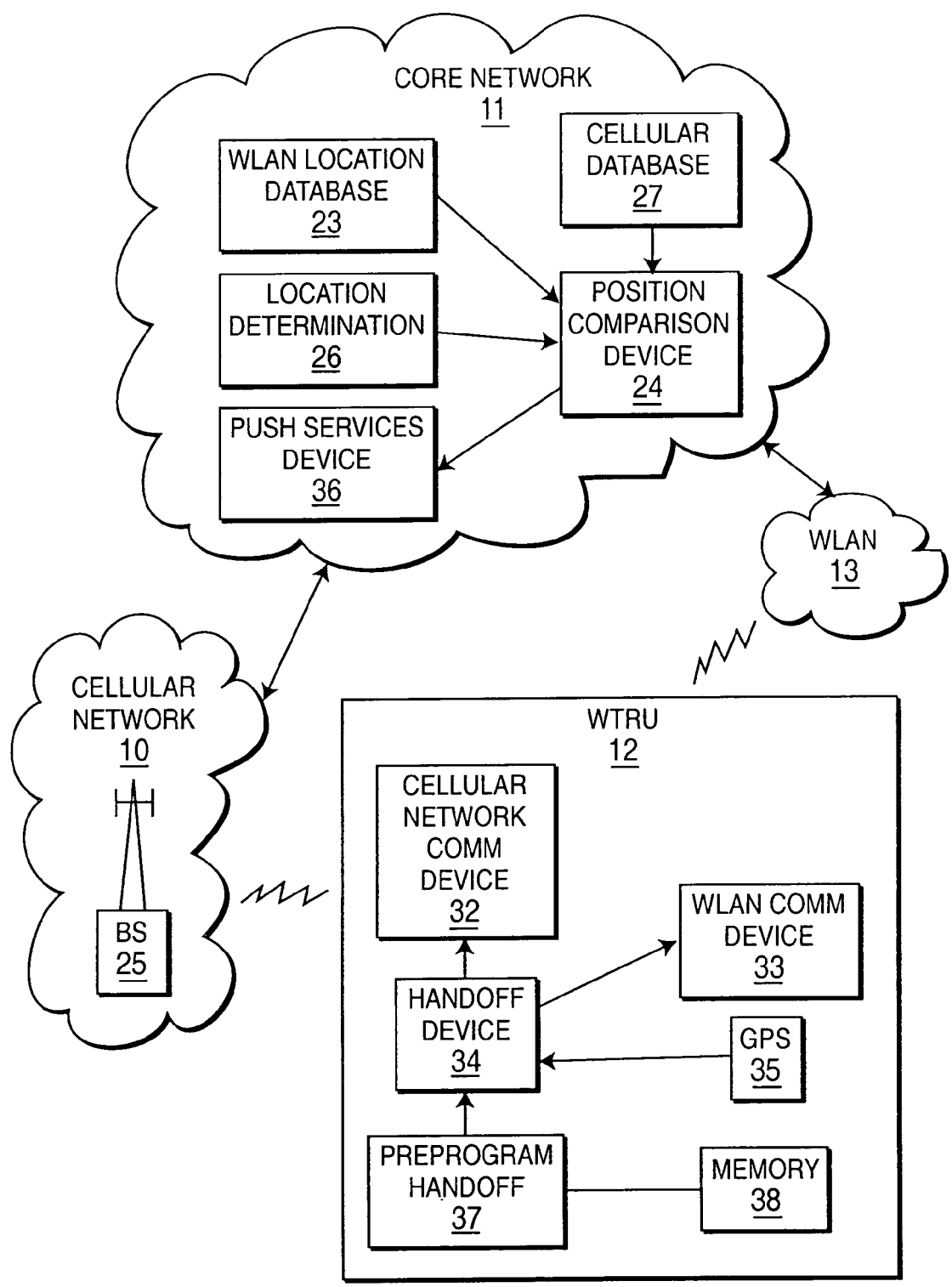
FIG. 1 is a general configuration of a wireless communication system in which a wireless mobile unit communicates with a core network for handoff to a WLAN.

The present invention will be described with reference to the figures wherein like numerals represent like elements throughout.

The present invention is directed to wireless communication systems with user equipments whose geolocation can be determined More particularly, the invention is a system for hand over between cellular system and a wireless local area network (WLAN) and vice versa of a user based on his/her location. The user equipment can be a cellular mobile phone or a wireless PDA or a WLAN card or various combinations of these, such as a wireless PDA with a WLAN modem. Henceforth, any such user equipment shall be denoted as a wireless transmit receive unit (WTRU). The location of a WTRU can be determined by one of several established methods. For example, the WTRU can determine its own location using a built in GPS receiver. A second method is the use of network based location methods. In network based location methods, the network determines the location of a WTRU using AOA (angle of arrival) or TDOA (time difference of arrival) techniques and other techniques, by which calculation of the location of the WTRU is performed by the network, either at the base station, Node B or elsewhere on the fixed portions of the network. In the case of a WLAN, the WLAN could provide the calculations. In time distance of TDOA location, a WTRU establishes communications with the network, and the system determines location by knowing the transmit and receive time. The WTRU's signal is received at various antenna sites. Since each antenna is a (usually) different distance from the caller, the signal arrives at a slightly different time. Base station receivers associated with the antenna sites are synchronized by an atomic clock and adjusted for internal signal latency. The base station receivers send the caller's call and timing data on to the mobile switch, where the times are compared and computed to generate a latitude and longitude for the caller. Preferably the signals received by at least three different antennas are processed. The technique requires signal timing information from at least three different antenna sites, but does not require that the WTRUs have internal location equipment. A third method could be a hybrid GPS/network location method, where the network assists the WTRU to determine its own location more efficiently than with a built in independent GPS receiver. This is advantageous because of the limited availability of GPS signals. In any case, it follows that there are several methods available to the WTRU location to be determined. Each method will produce an estimate of the location with an associated margin of estimation error. The location of the WTRU is known to the network and at all times.

The network that provides the cellular and WLAN coverage also has the geolocations of the coverage area. The geolocation of the coverage are can be calculated by the network by knowing the coverage of the cellular network or WLAN and knowing the geolocation of the cellular or WLAN transmitter. This way the network can determine the geolocation of the coverage. WTRU is dual mode device capable of accessing the cellular network and WLAN simultaneously. WTRU periodically sends the updated location to the core network.

If the user with the WTRU having access to the cellular network and wireless LAN, is moving through a cellular network and has reached a point where there is no cellular coverage and there is WLAN coverage or same user is moving through a cellular coverage network which also has a WLAN access, can be informed about the existence of the WLAN coverage through push services. The push service can be any of the application level triggers such as being paged, uses of SMS. This will enable the user to make the decision if he/she wants to switch to WLAN. The decision to switch could be based on many factors such as the cost of WLAN, the speed and through put of WLAN compared to cellular network and requirement of the application currently being used.

The same techniques can be applied to when the user with the WTRU having access to cellular network and wireless LAN is in WLAN and has the option of switching to cellular network.

FIG. 1 is a general configuration of a wireless communication system which includes a cellular network 10, a core network 11, a mobile unit such as a wireless transmit and receive unit (WTRU) 12, and a WLAN 13. In many cases the cellular network 10 will be an integral part of the core network 11 and the WLAN 13 will sometimes also be an integral part of the core network 11. The WTRU 12 communicates with a core network 11 via a cellular radio access network (RAN) 10 for handoff to a WLAN 13. The core network 11 could be any network (like IS-41 core network, GPRS IP core network, or Evolved GSM core network) that connects to a cellular radio access network (RAN) (such as GSM RAN, IS-95 RAN, CDMA RAN or WCDMA RAN). The WTRU 12 is capable of communicating with either the cellular radio access network (RAN) 10 or various local networks, such as WLAN 13.

The core network 11 includes a WLAN service location database 23 and a position comparison device 24. A location device 26 permits the core network 11 to determine the location of the WTRUs 12.

The WTRUs 12 each include a cellular network communication device 32, a WLAN communication device 33, and a handoff device 34. Optionally some or all of the WTRUs 12 may have a GPS receiver 35. The location determination may be performed by the cellular 10 or core 11 network, using location information available at the networks, or by the WTRU 12, such as by using the GPS receiver 35. The location of a WTRU 12 can be determined by using a built in GPS receiver, using AOA (angle of arrival), TDOA (time difference of arrival) techniques, a hybrid GPS/network location method, or any other convenient method. In addition, a cellular service location database 27 is provided, which includes coverage location information of cellular service other than WLAN 13 coverage. The WLAN service location database 23 and cellular service location database 27 are matched to the location information by the position comparison device 24. The use of the databases enables the information in the databases 23, 27 to be used when the mobile can do a handoff from WLAN to cellular network. This allows information concerning the availability of the cellular network to be pushed through the WLAN 13.

If a particular WTRU 12 determines the location, the location is sent to the core network 11, such as by signaling the information. The WLAN service location database 23 includes information concerning the geographical locations of WLANs, such as WLAN 13. The WLAN 13 communicates with the core network 11 and can update/modify the contents of the WLAN service location database 23. The WTRU 12 includes a cellular network communication device 32, a WLAN communication device 33 and a handoff device 34 to facilitate a handoff between the core network 11 and the WLAN 13. The position comparison device 24 finds WLANs servicing the determined position of the WTRUs 12 using the WLAN service location database 23.

In operation, the core network 11 communicates with the WTRU 12 through base stations of the cellular radio access network (RAN) 10, such as base station 25. As part of the communication function, the core network 11 can provide handoff information, which indicates the availability of a WLAN 13 based on the WTRU's location.

In one configuration, the WTRU 12 provides positioning data from the GPS receiver 35 to the core network 11. This positioning data indicates the location of the WTRU 12. This information is provided to a position comparison device 24, which compares the position of the WTRU 12 to known servicing areas of local wireless networks, such as WLAN 13, and the base stations 25 of the core network 11. The WLAN service location database 23 provides mapping data concerning the radio coverage areas of these local wireless networks.

Further information, such as pricing, speed, service availability and available coverage of the WLANs may also be provided to the WTRU 12. Effectively, this information is provided by push communication to the user, as indicated by push services device 36. "Push communication" is intended to describe the provision of information, referred to as "push" services, without the user specifically requesting the information at that time. To illustrate, the network 11 identifies a WLAN 13 in a WTRU's vicinity. The network 11 sends the WTRU 12 pricing and speed information of the WLAN 13. A user of the WTRU 12 can determine whether utilizing the WLAN 13 is desired, based on its cost and speed. The user selection can be predetermined, or can be elected "on the fly" upon notification of the availability of the WLAN services. In the case of predetermining whether to accept a handoff, the user can preprogram handoff information, as indicated at block 37, which would store user pre-selection criteria in memory 38

Likewise, there may be instances in which the user may wish to terminate communications or terminate particular types of communications when leaving the coverage area of the WLAN. Examples would be the use of free or low cost services such as high bandwidth data transfers, or the provision of local voice communication services. Therefore, the WLAN 13 is preferably able to notify the WTRU when WLAN service is to be discontinued, or a handoff to the core network 11 is available. Preferably, the user can decline to continue service after the handoff to the core network 11, and it is also preferable that the user can make the determination whether to accept the handoff prior to the handoff.

The core network 11 additionally can provide information to the WLAN 13 to facilitate handover, such as information indicating that the WTRU 12 may be able to receive signals from the WLAN 13. After handover, the WLAN 13 may also provide "push" services. These services may be provided on a continuous basis. Such information may include shopping information, or information concerning directions in the WLAN 13. The mobile user can select to receive this information. To illustrate, the user can turn on a WLAN feature, the WTRU 12 is able to receive WLAN information without otherwise requesting it. The provision of the WLAN service location database 23 and the cellular service location database 27 provides for information about the availability of a handoff between the WLAN and cellular service. The database information can also be provided to the WTRU 12 by "push" delivery to the WTRU through either the WLAN or the cellular network.

It is possible for the WTRU 12 to provide location information to WLAN 13 when WTRU 12 is serviced by WLAN 13. Whenever WTRU 12 provides the location information to WLAN 13 or WLAN 13 determines the location of WTRU 12, the WTRU 12 location information is updated in the core network 11 by WLAN 13. This information is used by the position comparison device 24 in the core network 11 for handoff from WLAN to the cellular network if required.

Figure 2:
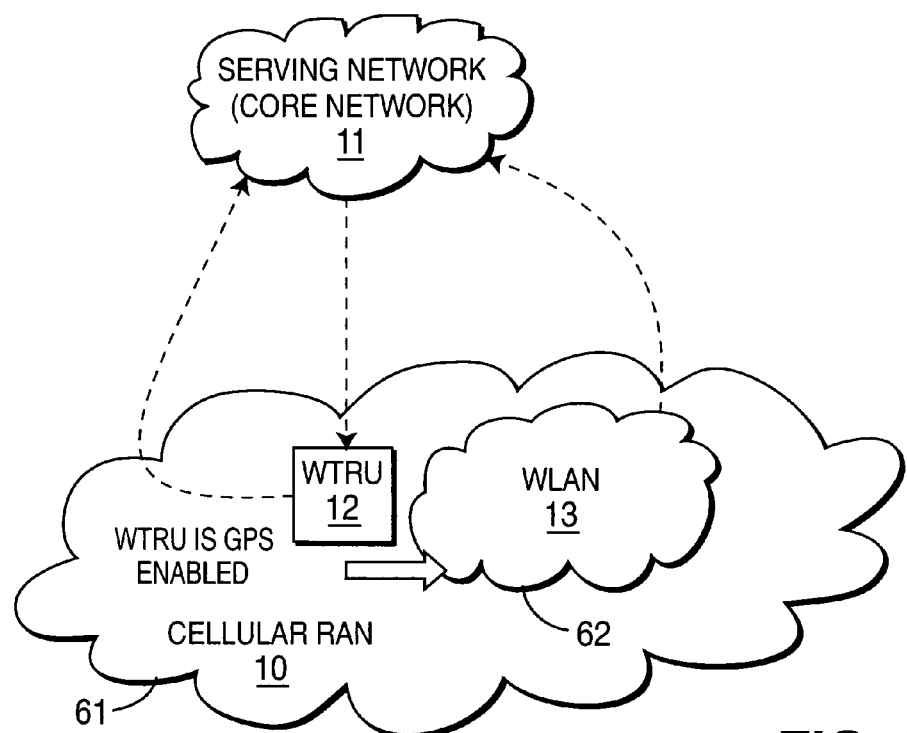
FIG. 2 illustrates a scenario where the mobile terminal is being serviced by the cellular network and has the option of using the WLAN.

Referring to FIG. 2, a WTRU 12 is shown traversing a cellular network 10. The WTRU's position is tracked. The WLAN boundary 62 is either known a priori by the network 11 or is provided by the WLAN 13. Accordingly, the core network 11 knows the current location or approximate location of the WTRU 12 and also the coverage area 62 of the WLAN 13. As can be seen, information from the WTRU 12 is provided to the core network 11 in which the WTRU 12 periodically updates the core network 11 about the location of the WTRU 12. Also as can be seen, the WLAN 13 provides information to the core network 11. This information may include information of the coverage area of the WLAN 13 and of services offered by the WLAN 13. The core network, 11 provides information to the WTRU 12 about the existence of the WLAN 13 network. This information from the core network to the WTRU 12 may be "push" information.

As the WTRU 12 moves through a geographic region serviced by the WLAN 13, the cellular network 10 serving the WTRU 12 informs the WTRU 12 of the existence of the WLAN 13, such as by using the "push" services, of the cellular network 10. The user can then chose to switch the network from the cellular network 10 to the WLAN 13. Other information as to the costs, choice of networks and other network features can also be sent as part of the "push" services.

Figure 3:
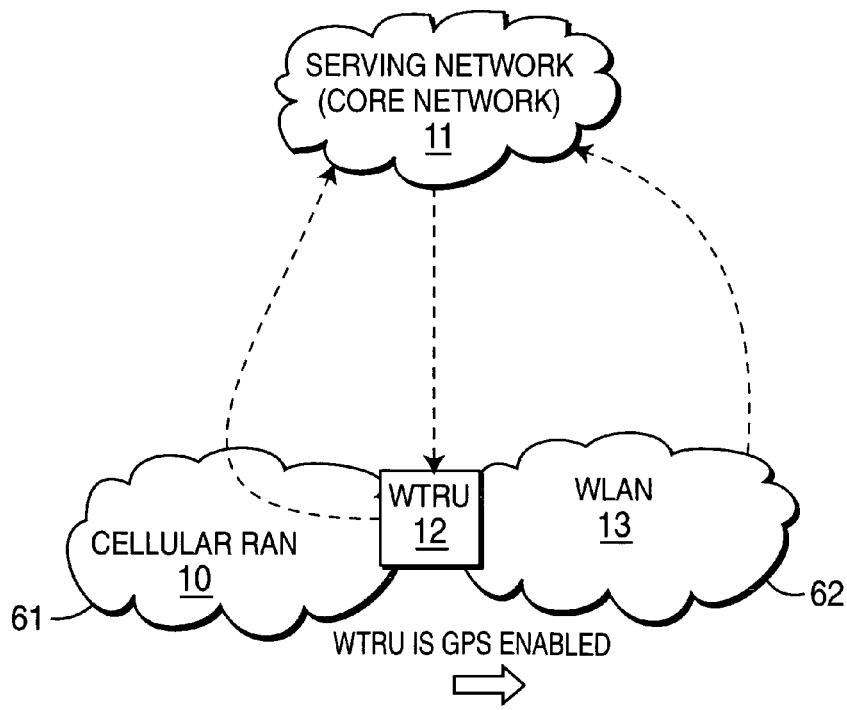
FIG. 3 illustrates a scenario where the cellular network is no longer available and the mobile terminal is entering an area serviced by the WLAN.

In another scenario as shown in FIG. 3, this switch between networks may be made automatically. In FIG. 3, the cellular RAN 10 is no longer available in the geographic area the WTRU 12 is moving towards.

As can be seen, information from the WTRU 12 is provided to the core network 11 in which the WTRU 12 periodically updates the core network 11 about the location of the WTRU 12. Also, as can be seen, the WLAN 13 provides information to the core network 11. This information may include information of the coverage area of the WLAN 13 and of services offered by the WLAN 13 and information to the WTRU 12 about the existence of the WLAN 13 network. This information from the core network to the WTRU 12 may be "push" information. As shown in FIG. 3, the cellular RAN 10 has a coverage region 61. The WLAN 13 has a coverage region 62, which is partially outside of the cellular network coverage region 61. If the core network 11 determines that the position of the WTRU 12 is within the WLAN region 62, the core network 11 is able to inform the WTRU 12 of the availability of WLAN services. When the WTRU 12 exits the geographical coverage 61 of the cellular network 10, the WTRU 12 is provided with handoff information identifying the WLAN 13 associated with the WLAN region 62. In this scenario, the handover to the WLAN 13 may be made without the knowledge of the mobile user. Alternately, the mobile user may be prompted through the "push" services to decide whether the current wireless service is to be dropped or supported by the WLAN 13, potentially at an additional cost. If the WTRU is GPS enabled or otherwise is provided with location information, the WTRU can directly determine whether to initiate execution of a handover.

One advantage of using "push" services is that at an application level the user can choose to switch the networks. The information about the costs and the speed of the new service can be provided as part of the information being pushed to the user. These costs can vary and depend upon the number of users in the service provider's network and other criteria. The "push" services allow the user to have the latest information available at all times.

What is claimed is:

1. System for handover of a mobile wireless transmit/receive unit (WTRU) between a cellular network and a wireless local area network (WLAN) comprising:
   a network communication device in a cellular network for communicating between a WLAN and the cellular network;
   a cellular network communication device in a mobile unit for communicating between the mobile unit and the cellular network;
   a WLAN communication device in the mobile unit for communicating between the mobile unit and the WLAN;
   a WTRU location device in the cellular network for determining the location of the mobile unit;
   a WLAN location device in the cellular network for determining the coverage area of the WLAN;
   a correlation device in the cellular network for correlating the location of the mobile unit with the coverage area of the WLAN;
   an informing device in the cellular network for sending a message to the mobile unit informing the mobile unit of the existence of the WLAN when the mobile unit approaches the coverage area of the WLAN prior to handover;
   a selection device in the mobile unit to provide user selection of the WLAN in response to the message indicating the availability of WLAN coverage, whereby the WTRU is configured to pre-select acceptance of communication through the WLAN; and
   a handoff device in the mobile unit for handing over the mobile unit between the cellular network and the WLAN when the mobile unit is in the corresponding coverage area.

2. The system of claim 1 wherein the handoff device provides a handoff from the cellular network to the WLAN when the mobile unit is in the coverage area of the WLAN.

3. The system of claim 1 wherein the handoff device provides a handoff from the WLAN to the cellular network when the determined location of the mobile unit indicates the mobile unit leaving the coverage area of the WLAN.

4. The system of claim 1 further comprising WLAN information device in the cellular network to provide further information to the WTRU concerning the WLAN coverage.

5. The system of claim 4 wherein the further information concerning the WLAN coverage, comprises at least one of cost, speed of the WLAN, and user services offered by the WLAN.

6. The system of claim 5 further comprising an acceptance device to provide user acceptance of communication through the WLAN in response to the data indicating the availability of WLAN coverage and the further information.

7. The system of claim 1 further comprising:
   a WLAN data device to provide data to the WTRU to indicate the availability of WLAN coverage and further information concerning the WLAN coverage, the further information comprising at least one of cost, speed of the WLAN, and user services offered by the WLAN; and
   a selection device to provide user selection of the WLAN in response to the data indicating the availability of WLAN coverage and the further information, wherein the user may pre-select acceptance of communication through the WLAN according to the further information, prior to handover.

8. A wireless transmit and receive unit (WTRU) comprising:
- a cellular network communication device for communicating with a cellular network and receiving a message from the cellular network prior to handover indicating the availability of a wireless local area network (WLAN) having a coverage area at a geolocation of the WTRU;
- a handoff acceptance device for accepting a handing over of the WTRU from the cellular network to the WLAN after receiving the WLAN indicator information;
- a WLAN communication device for communicating with the WLAN;
- a selection device for providing user selection of the WLAN in response to the message indicating the availability of WLAN coverage, whereby the WTRU is configured to pre-select acceptance of handover; and
- the handoff accepting device for handing over the WTRU between the cellular network and the WLAN when the WTRU is in the corresponding coverage area.

9. The WTRU of claim 8 wherein the handoff is from the cellular network to the WLAN when the WTRU has a geolocation in the coverage area of the WLAN.

10. The WTRU of claim 8 wherein the handoff is from the WLAN to the cellular network when the determined location of the WTRU indicates the WTRU leaving the coverage area of the WLAN.

11. The WTRU of claim 8 further comprising a circuit to receive data indicating the availability of WLAN coverage and further information concerning the WLAN coverage.

12. The WTRU of claim 11 wherein the further information concerning the WLAN coverage, comprises at least one of cost, speed of the WLAN, and user services offered by the WLAN.

13. The WTRU of claim 12 further comprising a circuit to provide user acceptance of communication through the WLAN in response to the data indicating the availability of WLAN coverage and the further information.

14. The WTRU of claim 8 further comprising:
- a circuit to receive data indicating the availability of WLAN coverage and further information concerning the WLAN coverage, the further information comprising at least one of cost, speed of the WLAN, and user services offered by the WLAN; and
- a circuit to provide user selection of the WLAN in response to the data indicating the availability of WLAN coverage and the further information, wherein the user may pre-select acceptance of communication through the WLAN according to the further information, prior to handover.

15. Method for handover of a mobile wireless transmit/receive unit (WTRU) between a cellular network and a wireless local area network (WLAN) comprising:
- establishing communication between the WLAN and a cellular network;
- determining in the cellular network the location of the mobile unit;
- determining in the cellular network the coverage area of the WLAN;
- correlating in the cellular network the location of the mobile unit with the coverage area of the WLAN;
- providing user selection of the WLAN in response to a message indicating the availability of WLAN coverage, whereby the WTRU is configured to pre-select acceptance of handover;
- sending the message to the mobile unit by the cellular network prior to handover informing the mobile unit of the existence of the WLAN when the location correlation indicates the mobile unit entering the coverage area of the WLAN; and
- handing over the mobile unit between the cellular network and the WLAN when the mobile unit is in the corresponding coverage area.

16. The method of claim 15 wherein the handing over provides a handoff from the cellular network to the WLAN when the mobile unit is in the coverage area of the WLAN.

17. The method of claim 15 wherein the handing over the mobile unit between the cellular network and the WLAN provides a handoff from the WLAN to the cellular network when the determined location of the mobile unit indicates the mobile unit leaving the coverage area of the WLAN.

18. The method of claim 15 further comprising providing information to the WTRU to indicate the availability of WLAN coverage and further information concerning the WLAN coverage.

19. The method of claim 18 wherein the further information comprises at least one of cost, speed of the WLAN, and user services offered by the WLAN.

20. The method of claim 19 further comprising providing user acceptance of communication through the WLAN in response to the information indicating the availability of WLAN coverage and the further information.

21. The method of claim 15, further comprising the WLAN interacting with the cellular network to provide the cellular network with data concerning coverage of the WLAN and services offered by said WLAN to the mobile units.

22. The method of claim 15 further comprising:
- providing data to the WTRU to indicate the availability of WLAN coverage and further information concerning the WLAN coverage, the further information comprising at least one of cost, speed of the WLAN, and user services offered by the WLAN; and
- providing user selection of the WLAN in response to the data indicating the availability of WLAN coverage and the further information, wherein the user may pre-select acceptance of communication through the WLAN according to the further information, prior to handover.

23. A mobile communications system, in which a core network provides wireless service to a plurality of multi-mode mobile units, and a first local network of a first type provides communication with ones of the mobile units, wherein mobile unit communications are handed over between said first local network and a second local network of a second type with which the mobile units are configured to communicate, the system comprising:
- a database, configured to be accessed by the core network, which includes information concerning the first and second local networks and geographic coverage of the first and second local networks; and
- a position comparison device, configured to be accessed by the core network, to identify a position of at least one mobile unit and to correlate the geographic coverage of the first and second local networks with the position of said one mobile unit and provide information concerning the correlation to a user of said one mobile unit prior to handover;

a selection device in said one mobile unit to provide user selection of the second local network in response to receiving said information, whereby the mobile unit is configured to pre-select acceptance of communication through the second local network; and a handover device in said one mobile unit to hand over the mobile unit between the first network and the second network when the mobile unit is in the corresponding coverage area.

24. The mobile communications system of claim 23, wherein the position identification function includes accepting signals from a GPS position locator associated with said one mobile unit.

25. The mobile communications system of claim 23, wherein the position identification function includes using network based location using signal calculations derived from communications with said one mobile unit.

26. The mobile communications system of claim 23, wherein the position identification function includes at least one of angle of arrival (AOA), time difference of arrival (TDOA) and GPS.

27. The mobile communications system of claim 23, wherein the position identification function is provided by a hybrid system using GPS position locator associated with said one mobile unit, and network based location.

28. The mobile communications system of claim 23, wherein one of the local networks is a digital cellular communications network and the other local network is a WLAN.

29. The mobile communications system of claim 23, wherein each local network interacts with the core network to provide the core network with information concerning the service area coverage of that local network and further information concerning that local network comprising at least one of cost, speed of that local network, and user services offered by that local network to the mobile units; and in addition to the information concerning the correlation of the geographic coverage of the first and second local networks with the position of said one mobile unit, the further information concerning at least one of the first and second local networks is provided to the user of the one mobile unit prior to handover.

30. The mobile communications system of claim 28, wherein each local network interacts with the core network to provide the position of the mobile unit when served by that local network.

* * * * *

UNITED STATES PATENT AND TRADEMARK OFFICE
CERTIFICATE OF CORRECTION

PATENT NO. : 7,089,005 B2
APPLICATION NO. : 10/626940
DATED : August 8, 2006
INVENTOR(S) : Gautam G. Reddy It is certified that error appears in the above-identified patent and that said Letters Patent is hereby corrected as shown below:

ON THE TITLE PAGE

Item (56), U.S. PATENT DOCUMENTS, page 1, right column, after line 2, insert --2001/0055976 A1 12/2001 Crouch--.

Item (56), page 1, right column, after FOREIGN PATENT DOCUMENTS, insert --OTHER PUBLICATIONS, Ylianttila et al.: "Geolocation Information and Inter-Technology Handoff", ICC 2000, 2000 IEEE International Conference on Communications. Conference Record. vol 3 of 3, 18 June 2000, pages 1573-1577.--.

At column 2, line 10, after the word "cellular", insert --a--.

At column 4, line 34, after "38", insert --.--.

At column 5, line 27, after the word "then", delete "chose" and insert therefor --choose--.

At claim 4, column 6, line 47, after the word "comprising", insert --a--.

At claim 17, column 8, line 16, after the word "over", insert --of--.

Signed and Sealed this

Sixteenth Day of January, 2007

JON W. DUDAS
*Director of the United States Patent and Trademark Office*